US010193368B2

(12) United States Patent
Zhang et al.

(10) Patent No.: US 10,193,368 B2
(45) Date of Patent: Jan. 29, 2019

(54) CHARGING CONTROL APPARATUS AND METHOD FOR ELECTRONIC DEVICE

(71) Applicant: GUANGDONG OPPO MOBILE TELECOMMUNICATIONS CORP., LTD., Dongguan, Guangdong (CN)

(72) Inventors: Jialiang Zhang, Guangdong (CN); Kewei Wu, Guangdong (CN); Jun Zhang, Guangdong (CN); Dashuai Huang, Guangdong (CN); Yuanxiang Hu, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/961,739

(22) Filed: Apr. 24, 2018

(65) Prior Publication Data

US 2018/0241238 A1 Aug. 23, 2018

Related U.S. Application Data

(63) Continuation of application No. 15/114,990, filed as application No. PCT/CN2014/076871 on May 6, 2014.

(30) Foreign Application Priority Data

Jan. 28, 2014 (CN) .......................... 2014 1 0042510

(51) Int. Cl.
*H02J 7/00* (2006.01)
*H02J 7/04* (2006.01)
(Continued)

(52) U.S. Cl.
CPC .......... *H02J 7/0072* (2013.01); *H02J 7/0052* (2013.01); *H02J 7/045* (2013.01); *H02M 1/44* (2013.01);
(Continued)

(58) Field of Classification Search
USPC .......................................................... 320/128
See application file for complete search history.

(56) References Cited

U.S. PATENT DOCUMENTS 7,012,405 B2 * 3/2006 Nishida ................. H02J 7/0073 320/137
7,592,780 B2 * 9/2009 Funabashi .............. H02J 7/022 320/150
(Continued)

FOREIGN PATENT DOCUMENTS

CN 1592029 A 3/2005
CN 101110522 A 1/2008
(Continued)

OTHER PUBLICATIONS

Chinese Patent Application No. 201410042510.5 Second Office Action dated Sep. 26, 2016, with English translation, 12 pages.
(Continued)

*Primary Examiner* — Samuel Berhanu
(74) *Attorney, Agent, or Firm* — Lathrop Gage LLP

(57) ABSTRACT

A charging control apparatus and method for an electronic device are provided. During a process of charging, the power adapter first charges the battery with a constant-voltage direct current output, and then after the power adapter receives a quick-charging instruction, the power adapter adjusts an output voltage according to the voltage of the battery fed back by the charging control module, and if the output voltage meets a quick-charging voltage condition pre-set by the charging control module, the power adapter adjusts an output current and the output voltage respectively according to a preset quick-charging current value and a preset quick-charging voltage value for quick-charging the battery, and meanwhile the charging control module introduces direct current from the power adapter for charging the battery; during a process of quick-charging, the power
(Continued)

electronic device
battery charging apparatus
100
power adapter
10
20
200
charging control circuit
300
battery adapter adjusts the output current in real time according to the output voltage thereof and the voltage of the battery.

20 Claims, 5 Drawing Sheets

(51) Int. Cl.
*H02M 1/44* (2007.01)
*H02M 7/04* (2006.01)
*H02M 1/00* (2006.01)

(52) U.S. Cl.
CPC ...... *H02M 7/04* (2013.01); *H02M 2001/0009* (2013.01)

(56) References Cited

U.S. PATENT DOCUMENTS

| | | | | |
|---|---|---|---|---|
| 9,843,137 | B2 * | 12/2017 | McCracken | H01R 13/62 |
| 2006/0076921 | A1 * | 4/2006 | Kubota | H02J 7/0072 320/107 |
| 2011/0248670 | A1 * | 10/2011 | Yamazaki | H01M 2/0212 320/107 |

FOREIGN PATENT DOCUMENTS

| | | | |
|---|---|---|---|
| CN | 101202462 | A | 6/2008 |
| CN | 101867204 | A | 10/2010 |
| CN | 102957193 | A | 3/2013 |
| CN | 203747454 | U | 7/2014 |

OTHER PUBLICATIONS

Chinese Patent Application No. 201410042510.5 First Office Action dated May 4, 2016, with English translation, 12 pages.

Chinese Patent Application No. 201410042510.5 Notification to Grant Patent Right for Invention, dated Jan. 3, 2018, 1 page.

Chinese Patent Application No. 201410042510.5 English translation of Notification to Grant Patent Right for Invention, dated Jan. 3, 2018, 2 pages.

Chinese Patent Application No. 201410042510.5 English translation of allowed claims dated Jan. 3, 2018, 10 pages.

* cited by examiner

CHARGING CONTROL APPARATUS AND METHOD FOR ELECTRONIC DEVICE

CROSS-REFERENCE TO RELATED APPLICATIONS

This application is a continuation application of U.S. application Ser. No. 15/114,990, filed Jul. 28, 2016, which is a national phase application of International Application No. PCT/CN2014/076871, filed on May 6, 2014, which is based on and claims priority to Chinese Patent Application No. 201410042510.5, filed on Jan. 28, 2014, the entire contents of which are incorporated herein by reference.

TECHNICAL FIELD

The present disclosure relates to the charging technology field, and more particularly, to a charging control apparatus and a charging control method for an electronic device.

BACKGROUND

Currently, a battery of an electronic device is charged by a power adapter of the electronic device. Usually, the power adapter charges the battery with a constant-voltage output mode. However, for the battery with large capacity, too long charging time may be caused because of the constant-voltage output mode. Therefore, quick-charging for the battery cannot be realized and the charging time cannot be shortened by adjusting an output current and an output voltage of the power adapter in the above related art.

SUMMARY

An embodiment of the present disclosure is realized as follows. A charging control apparatus for an electronic device includes a power adapter and a charging control module. The power adapter is configured to charge a battery in the electronic device and to perform data communication with the charging control module via a communication interface thereof. The charging control module is built in the electronic device and is configured to detect a voltage of the battery. The charging control module and the battery are coupled to the communication interface of the power adapter via a communication interface of the electronic device.

An embodiment of the present disclosure further provides a charging control method for an electronic device based on the above charging control apparatus for the electronic device. The charging control method for the electronic device can include the following:

- during a process of charging the battery, firstly charging the battery by the power adapter with the constant-voltage direct-current output;
- after receiving a quick-charging instruction sent by the charging control module, adjusting an output voltage by the power adapter according to a voltage of the battery fed back by the charging control module;
- if the output voltage meets a quick-charging voltage condition pre-set by the charging control module, adjusting an output current and the output voltage respectively by the power adapter according to a preset quick-charging current value and a preset quick-charging voltage value for quick-charging the battery, and introducing the direct current from the power adapter simultaneously by the charging control module for charging the battery; and
- adjusting the output current in real time by the power adapter according to the output voltage of the power adapter and the voltage of the battery.

The present disclosure further relates to a charging device for battery. The charging device for battery includes a transformer, a potential adjustment module, a main control module and a charging control module. The transformer is configured to output voltage and current to charge the battery. The potential adjustment module is coupled to the transformer and is configured to adjust output current of the transformer. The main control module is coupled to the potential adjustment module and is configured to control the potential adjusting module to adjust the output current of the transformer. The charging control module is coupled to the main control module and is configured to communicate with the main control module and obtain a real-time voltage of the battery. When the battery is charged, when the transformer outputs a first output current, the main control module communicates with the charging control module to inquiry whether the battery needs to be charged with a second output current output by the transformer, the second output current is larger than the first output current, the charging control module replies the main control module the real-time voltage of the battery and send charging instruction with the second output current to the main control module, the main control module controls the transformer to output the second output current to charge the battery via the potential adjustment module according to the real-time voltage of the battery.

DETAILED DESCRIPTION OF THE PRESENT DISCLOSURE

To make the objectives, the technical solutions, and the advantages of embodiments of the present disclosure clearer, the technical solutions in embodiments of the present disclosure are hereinafter described clearly and completely with reference to the accompanying drawings in embodiments of the present disclosure. It should be understood that, specific embodiments described herein are merely used to explain the present disclosure, but not used to limit the present disclosure.

Figure 1:
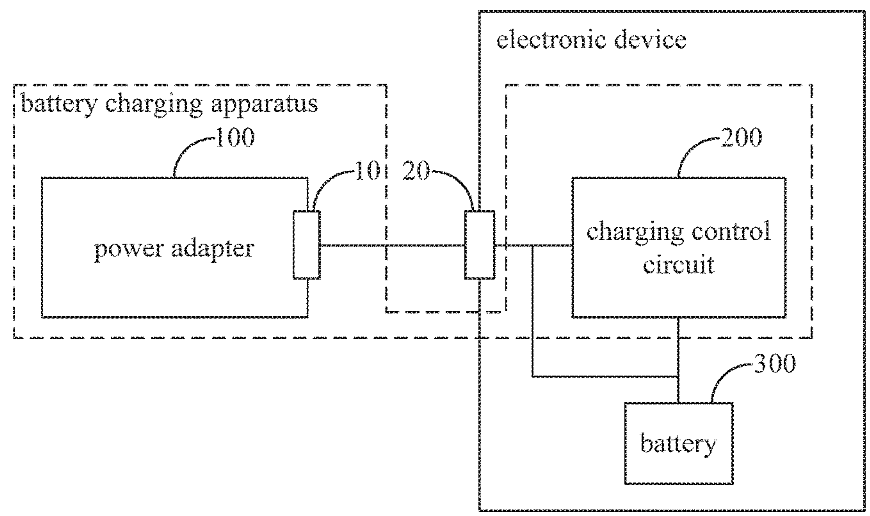
FIG. 1 is a topology diagram showing a charging control apparatus for an electronic device according to an embodiment of the present disclosure.

FIG. 1 illustrates a topology structure of a charging control apparatus for an electronic device according to an embodiment of the present disclosure. For illustration purposes, only the parts related to embodiments of the present disclosure are shown, which will be described in detail as follows.

The charging control apparatus for the electronic device provided in embodiments of the present disclosure includes a power adapter 100 and a charging control module 200. The power adapter 100 charges a battery 300 in the electronic device and performs data communication with the charging control module 200 via a communication interface 10 thereof. The charging control module 200 is built in the electronic device and is configured to detect a voltage of the battery 300. The charging control module 200 and the battery 300 are both coupled to the communication interface 10 of the power adapter 100 via a communication interface 20 of the electronic device.

During a process of charging the battery 300, the power adapter 100 charges the battery 300 with a constant-voltage direct current output firstly. After receiving a quick-charging instruction sent by the charging control module 200, the power adapter 100 adjusts an output voltage according to the voltage of the battery 300 fed back by the charging control module 200. Then, if the output voltage meets a quick-charging voltage condition pre-set by the charging control module 200, the power adapter 100 adjusts an output current and the output voltage respectively according to a preset quick-charging current value and a preset quick-charging voltage value, for quick-charging the battery 300, and meanwhile the charging control module 200 introduces the direct current from the power adapter 100 for charging the battery 300. During a process of quick-charging, the power adapter 100 adjusts the output current in real time according to the output voltage thereof and the voltage of the battery 300.

Figure 2:
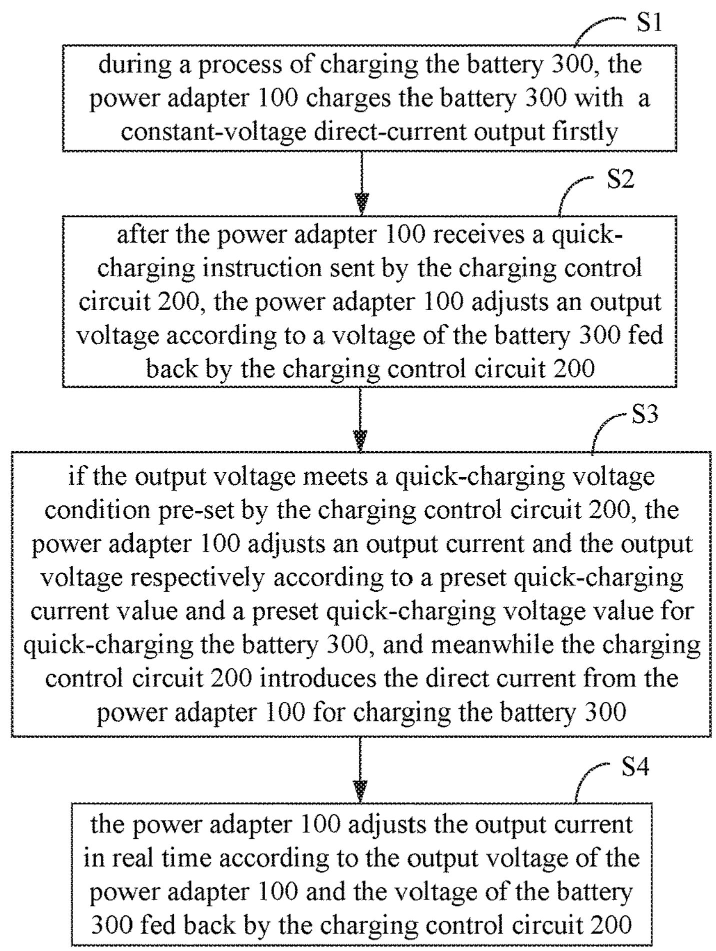
FIG. 2 is a flow chart showing a charging control method for an electronic device based on the charging control apparatus for the electronic device shown in FIG. 1.

Based on the charging control apparatus for the electronic device shown in FIG. 1, embodiments of the present disclosure also provide a charging control method for an electronic device. As shown in FIG. 2, the charging control method for the electronic device includes the following.

In block S1, during a process of charging the battery 300, the power adapter 100 charges the battery 300 with the constant-voltage direct-current output firstly.

In block S2, after the power adapter 100 receives a quick-charging instruction sent by the charging control module 200, the power adapter 100 adjusts an output voltage according to a voltage of the battery 300 fed back by the charging control module 200.

In block S3, if the output voltage of the power adapter 100 meets a quick-charging voltage condition pre-set by the charging control module 200, the power adapter 100 adjusts an output current and the output voltage respectively according to a preset quick-charging current value and a preset quick-charging voltage value for quick-charging the battery 300, and the charging control module 200 introduces the direct current from the power adapter 100 simultaneously for charging the battery 300.

In block S4, the power adapter 100 adjusts the output current in real time according to the output voltage of the power adapter 100 and the voltage of the battery 300 fed back by the charging control module 200.

The quick-charging current value may be 4 A, and the quick-charging voltage may be any one selected from a range of 3.4V~4.8V.

In at least one embodiment, the quick-charging instruction mentioned in block S2, which is sent by the charging control module 200 and received by the power adapter 100, may be explained as follows.

When the power adapter 100 performs data communication with the charging control module 200, the power adapter 100 sends a quick-charging inquiry instruction to the charging control module 200 if the output current of the power adapter 100 is within a conventional current range during a preset period of time. The charging control module 200 determines the voltage of the battery 300 according to the quick-charging inquiry instruction. If the voltage of the battery 300 reaches the quick-charging voltage value, the charging control module 200 feeds back the quick-charging instruction to the power adapter 100.

The above preset period of time may be 3 S (second), and the conventional current range may be set as [1 A, 4 A].

The quick-charging voltage condition pre-set by the charging control module 200, which is mentioned in block S3 and is met by the output voltage of the power adapter 100, may be explained as follows.

When the power adapter 100 performs data communication with the charging control module 200, the power adapter 100 sends output voltage information to the charging control module 200. The charging control module 200 determines whether the output voltage of the power adapter 100 meets the quick-charging voltage condition (in a quick-charging voltage range) according to the output voltage information, and if yes, the above block S3 is executed.

In addition, a following block (shown in FIG. 3) after block S2 may be included if the output voltage of the power adapter 100 does not meet the quick-charging voltage condition.

In block S5, the power adapter 100 adjusts the output current according to a voltage deviation feedback signal sent by the charging control module 200, if the output voltage of the power adapter 100 does not meet the quick-charging voltage condition pre-set by the charging control module 200.

In at least one embodiment, the voltage deviation feedback signal includes a low voltage feedback signal and a high voltage feedback signal. If the voltage is lower, the power adapter 100 increases the output voltage according to the low voltage feedback signal, and if the voltage is higher, the power adapter 100 decreases the output voltage according to the high voltage feedback signal.

Figure 3:
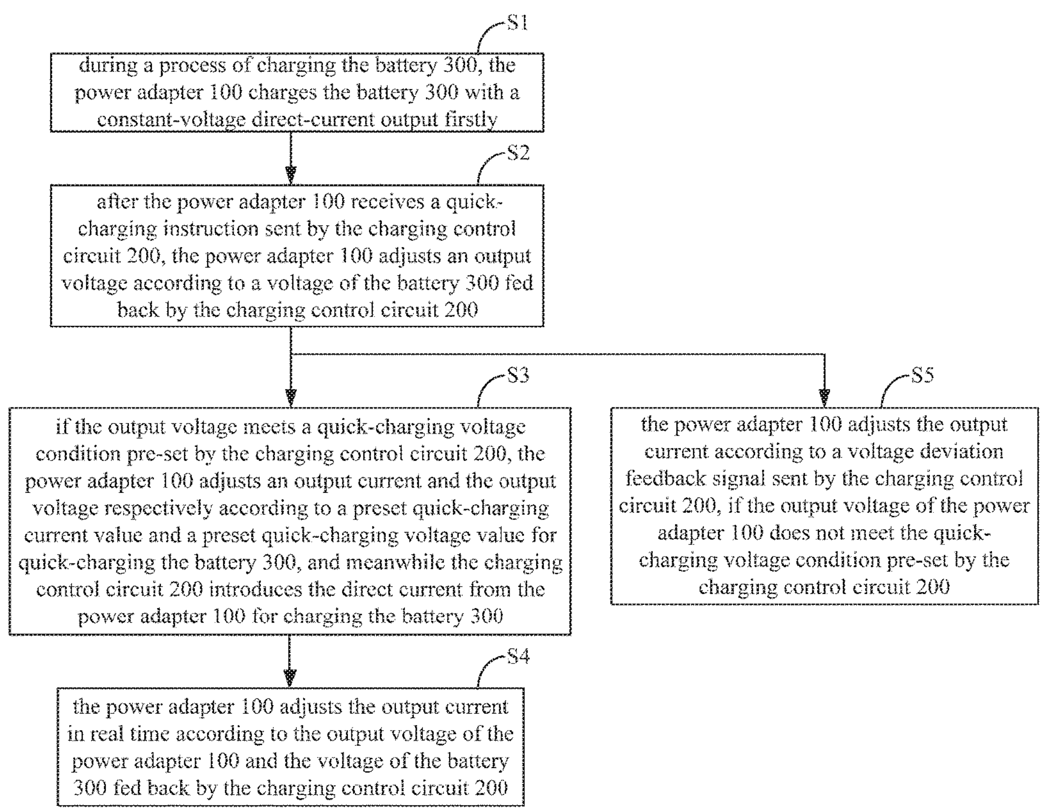
FIG. 3 is another flow chart showing a charging control method for an electronic device based on the charging control apparatus for the electronic device shown in FIG. 1.

For the charging control methods for the electronic device shown in FIGS. 2 and 3, a block of charging the battery 300 firstly by the power adapter 100 with the constant-voltage direct-current output in block S1 may be explained specifically as follows.

The power adapter 100 detects and determines whether a voltage at the communication interface 10 is greater than a voltage threshold under a case that the direct current output of the power adapter 100 is turned off. If yes, the power adapter 100 continues to detect and determine whether the voltage at the communication interface 10 is greater than the voltage threshold under the case that the direct current output is turned off (which means that the electronic device does not quit the quick-charging mode). If no, the power adapter 100 outputs the direct current according to a preset conventional output voltage.

The voltage threshold may be 2V, and the conventional output voltage may be 5.1V.

For the charging control methods for the electronic device shown in FIGS. 2 and 3, a block of adjusting an output voltage according to a voltage of the battery 300 fed back by the charging control module 200 in block S2 may be explained specifically as follows.

The power adapter 100 calculates a sum of the voltage of the battery 300 fed back by the charging control module 200 and a preset voltage incremental value, so as to obtain the preset quick-charging voltage value.

The power adapter 100 adjusts the output voltage according to the preset quick-charging voltage value.

The preset voltage incremental value may be 0.2V.

For the charging control methods for the electronic device shown in FIGS. 2 and 3, block S4 may be explained specifically as follows.

The power adapter 100 determines whether a difference between the output voltage and the voltage of the battery 300 is greater than a voltage difference threshold according to the voltage of the battery 300 fed back by the charging control module 200. If yes, the power adapter 100 turns off the direct current output (this indicates that a wire impedance between the communication interface 10 of the power adapter 100 and the communication interface 20 of the electronic device is abnormal and the power adapter 100 needs to stop outputting the direct current). If no, the power adapter 100 adjusts the output current according to the voltage of the battery 300 fed back by the charging control module 200.

The voltage difference threshold may be 0.8V.

Figure 4:
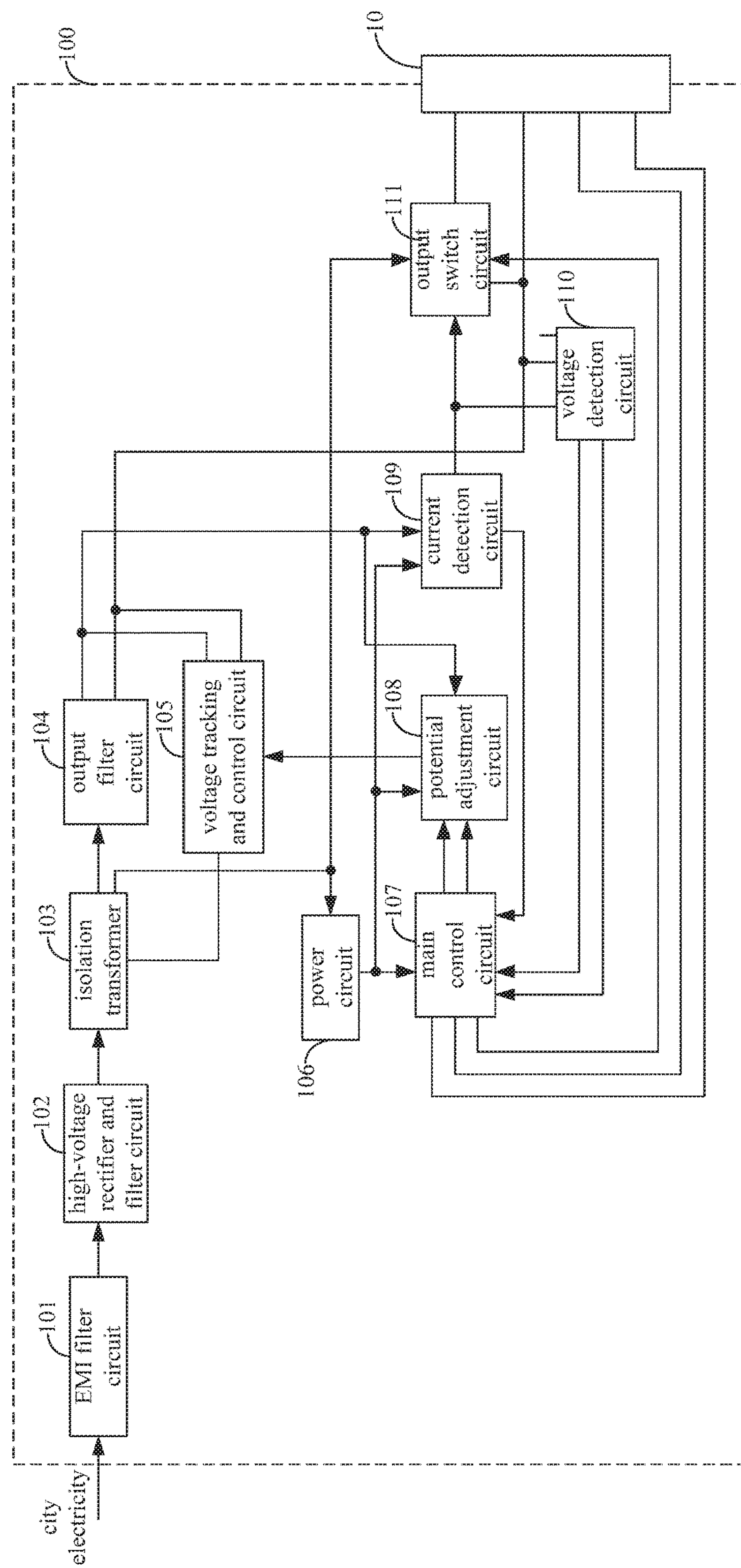
FIG. 4 is an exemplary block diagram illustrating a charging control apparatus for an electronic device according to an embodiment of the present disclosure.
Figure 5:
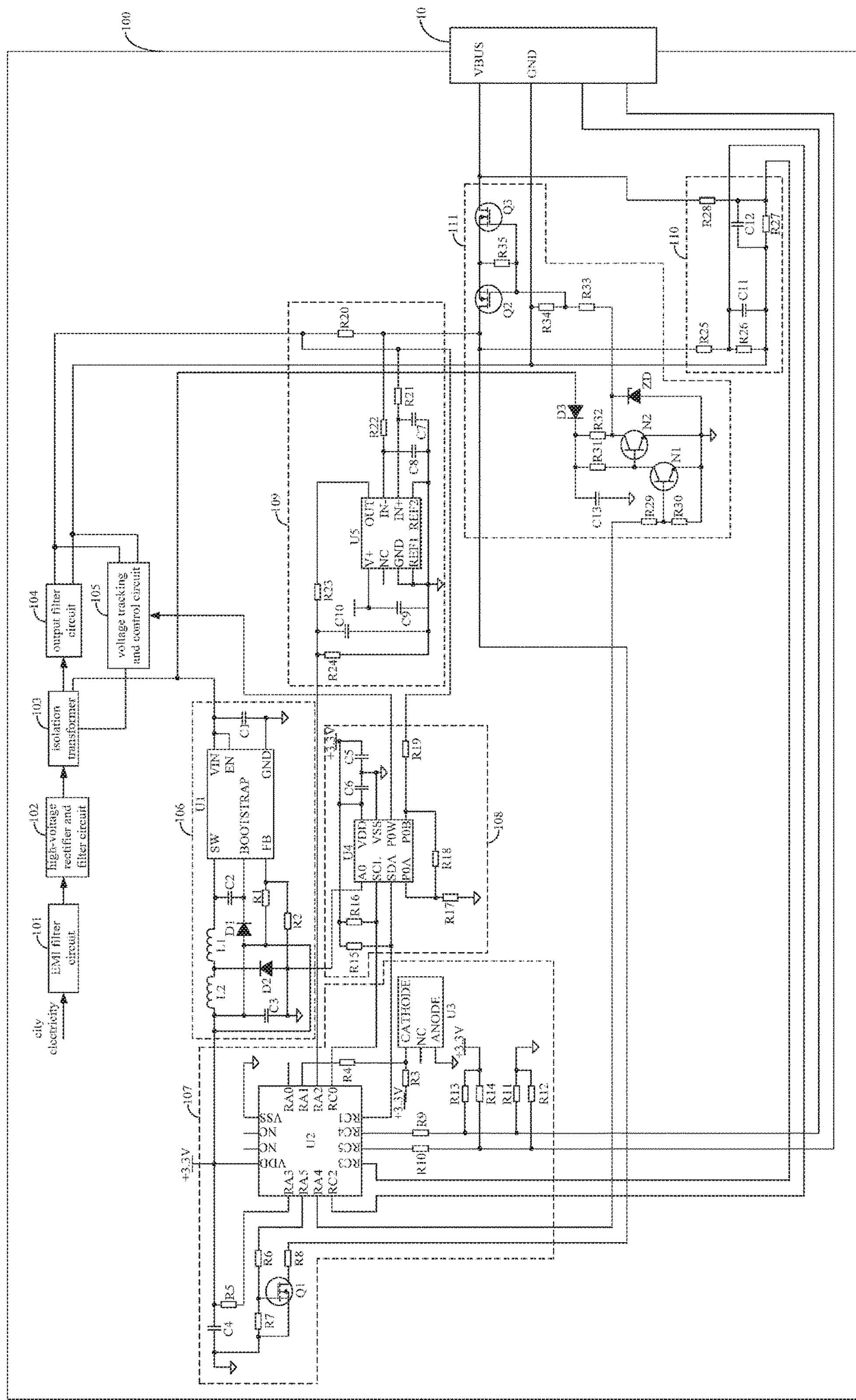
FIG. 5 is a schematic diagram showing an exemplary module structure of a power adapter in a charging control apparatus for an electronic device according to an embodiment of the present disclosure.

In order to realize a charging control apparatus for an electronic device relied on by the above charging control method for the electronic device, FIG. 4 illustrates an exemplary block diagram of the charging control apparatus for the electronic device, and FIG. 5 illustrates an exemplary module structure of the above power adapter 100. For illustration purposes, only the parts related to embodiments of the present disclosure are shown, which will be described in detail as follows.

Referring to FIGS. 4 and 5, the power adapter 100 includes an EMI filter module 101, a high-voltage rectifier and filter module 102, an isolation transformer 103, an output filter module 104 and a voltage tracking and control module 105. The EMI filter module 101 is configured perform an electromagnetic interference filter on the city electricity, the high-voltage rectifier and filter module 102 is configured to perform a rectifier and filter on the city electricity after the electromagnetic interference filter for outputting a high-voltage direct current, the isolation transformer 103 is configured to perform an electrical isolation on the high-voltage direct current, the output filter module 104 is configured to perform a filter process on an output voltage of the isolation transformer 103 for charging the battery, and the voltage tracking and control module 105 is configured to adjust the output voltage of the isolation transformer 103 according to an output voltage of the output filter module 104.

The power adapter 100 further includes a power module 106, a main control module 107, a potential adjustment module 108, a current detection module 109, a voltage detection module 110 and an output switch module 111.

An input terminal of the power module 106 is coupled to a secondary terminal of the isolation transformer 103, and a power terminal of the main control module 107, a power terminal of the potential adjustment module 108 and a power terminal of the current detection module 109 are collectively coupled to an output terminal of the power module 106. A high-potential terminal of the main control module 107 and a high-potential terminal of the potential adjustment module 108 are both coupled to a positive output terminal of the output filter module 104. A potential adjustment terminal of the potential adjustment module 108 is coupled to the voltage tracking and control module 105. A direct current input terminal of the current detection module 109 is coupled to the positive output terminal of the output filter module 104, and a current sensing and feedback terminal of the current detection module 109 is coupled to a current detection terminal of the main control module 107. A clock output terminal and a data output terminal of the main control module 107 are coupled to a clock input terminal and a data input terminal of the potential adjustment module 108 respectively. A first detection terminal and a second detection terminal of the voltage detection module 110 are coupled to a direct current output terminal of the current detection module 109 and a negative output terminal of the output filter module 104 respectively, and a first output terminal and a second output terminal of the voltage detection module 110 are coupled to a first voltage detection terminal and a second voltage detection terminal of the main control module 107 respectively. An input terminal of the output switch module 111 is coupled to the direct current output terminal of the current detection module 109, an output terminal of the output switch module 111 is coupled to a third detection terminal of the voltage detection module 110, a ground terminal of the output switch module 111 is coupled to the negative output terminal of the output filter module 104, and a controlled terminal and a power terminal of the output switch module 111 are coupled to a switch control terminal of the main control module 107 and the secondary terminal of the isolation transformer 103 respectively. Each of the negative output terminal of the output filter module 104, the output terminal of the output switch module 111, and a first communication terminal and a second communication terminal of the main control module 107 is coupled to the communication interface 10 of the power adapter 100.

When the power adapter 100 charges the battery 300 with the constant-voltage direct-current output firstly, the main control module 107 controls the output switch module 111 to turn off the direct current output of the power adapter 100. The voltage detection module 110 detects the output voltage of the power adapter 100 and feeds back a voltage detection signal to the main control module 107. The main control module 107 determines whether the output voltage of the power adapter 100 is greater than a voltage threshold (for example, 2V) according to the voltage detection signal. If the output voltage of the power adapter 100 is greater than the voltage threshold, the voltage detection module 110 continues to detect the output voltage of the power adapter 100. If the output voltage of the power adapter 100 is not greater than the voltage threshold, the main control module 107 controls the output switch module 111 to turn on the direct current output of the power adapter 100, and drives the voltage tracking and control module 105 via the potential adjustment module 108 to set the output voltage of the isolation transformer 103 as a conventional output voltage (for example, 5.1V). The current detection module 109 detects the output current of the power adapter 100 and feeds back a current detection signal to the main control module 107. If the main control module 107 determines that the output current of the power adapter 100 is within a conventional current range (for example, 1 A~4 A) for a preset period of time (for example, 3 S) according to the current detection signal, the main control module 107 performs a quick-charging inquiry communication with the charging control module 200. After the charging control module 200 sends the quick-charging instruction to the main control module 107, the main control module 107 drives the voltage tracking and control module 105 via the potential adjustment module 108 to adjust the output voltage of the isolation transformer (i.e. adjust the output voltage of the power adapter 100) according to the voltage of the battery 300 fed back by the charging control module 200. If the output voltage of the power adapter 100 meets the quick-charging voltage condition (i.e., within the rated quick-charging voltage range or equal to the rated quick-charging voltage value) pre-set by the charging control module 200, the main control module 107 drives the voltage tracking and control module 105 via the potential adjustment module 108 to adjust the output voltage of the isolation transformer 103, such that the power adapter 100 outputs the direct current according to the quick-charging current value (for example, 4 A) and the quick-charging voltage value (for example, any value between 3.4V~4.8V) for quick-charging the battery 300. At the same time, the charging control module 200 introduces the direct current from the power adapter 100 to charge the battery 300. During the process of quick-charging, the main control module 107 determines whether a difference between the output voltage and the voltage of the battery 300 is greater than a voltage difference threshold according to the voltage of the battery 300 fed back by the charging control module 200. If the difference is greater than the voltage difference threshold, the main control module 107 controls the output switch module 111 to turn off the direct current output (this indicates that a wire impedance between the communication interface 10 of the power adapter 100 and the communication interface 20 of the electronic device is abnormal and the power adapter 100 needs to stop outputting the direct current). If the difference is not greater than the difference voltage threshold, the main control module 107 drives the voltage tracking and control module 105 via the potential adjustment module 108 to adjust the output voltage of the isolation transformer 103 according to the voltage of the battery 300 fed back by the charging control module 200, such that adjusting the output current of the power adapter 100 is realized.

When the power adapter 100 charges the battery 300 with the constant-voltage direct-current output firstly, if the output current of the power adapter 100 is less than a current lower limit (for example, 1 A), the current detection module 109 continues to detect the output current of the power adapter 100 and to feed back the current detection signal to the main control module 107, and if the output current of the power adapter 100 is greater than a current upper limit (for example, 4 A), the main control module 107 controls the output switch module 111 to turn off the direct current output of the power adapter 100, thus realizing short-module protection.

If the output voltage of the power adapter 100 does not meet the above quick-charging voltage condition, the main control module 107 drives the voltage tracking and control module 105 via the potential adjustment module 108 to adjust the output voltage of the isolation transformer 103 according to a voltage deviation feedback signal sent by the charging control module 200. The voltage deviation feedback signal includes a low voltage feedback signal and a high voltage feedback signal. If the voltage is lower, the main control module 107 drives the voltage tracking and control module 105 via the potential adjustment module 108 to increase the output voltage of the isolation transformer 103 according to the low voltage feedback signal, and if the voltage is higher, the main control module 107 drives the voltage tracking and control module 105 via the potential adjustment module 108 to decrease the output voltage of the isolation transformer 103 according to the high voltage feedback signal.

FIG. 5 illustrates the exemplary module structure of the above power adapter 100. For illustration purposes, only the parts related to embodiments of the present disclosure are shown, which will be described in detail as follows.

The power module 106 includes: a first capacitor C1, a voltage stabilizing chip U1, a second capacitor C2, a first inductor L1, a second inductor L2, a first diode D1, a second diode D2, a third capacitor C3, a first resistor R1 and a second resistor R2.

A collective node of a first terminal of the first capacitor C1, and an input power pin Vin and an enable pin EN of the voltage stabilizing chip U1 is configured as the input terminal of the power module 106. A second terminal of the first capacitor C1 and a ground pin GND of the voltage stabilizing chip U1 are collectively coupled to ground. A switch pin SW of the voltage stabilizing chip U1 and a first terminal of the second capacitor C2 are collectively coupled to a first terminal of the first inductor L1. An internal switch pin BOOST of the voltage stabilizing chip U1 and a second terminal of the second capacitor C2 are collectively coupled to a cathode of the first diode D1. A feedback voltage pin FB of the voltage stabilizing chip U1 is coupled to a first terminal of the first resistor R1 and a first terminal of the second resistor R2 respectively. A second terminal of the first inductor L1 and a cathode of the second diode D2 are collectively coupled to a first terminal of the second inductor L2. A collective node formed by collectively connecting a second terminal of the second inductor L2, an anode of the first diode D1, a second terminal of the first resistor R1 and a first terminal of the third capacitor C3 is configured as the output terminal of the power module 106. An anode of the second diode D2, a second terminal of the second resistor R2 and a second terminal of the third capacitor C3 are collectively coupled to ground. The power module 106 performs a voltage conversion processing on a voltage at the secondary terminal of the isolation transformer 103 by using the voltage stabilizing chip U1 as a core, and then outputs a voltage of +3.3V for supplying power for the main control module 107, the potential adjustment module 108 and the current detection module 109. The voltage stabilizing chip U1 may be a buck DC/DC converter with a model MCP16301.

The main control module 107 includes a main control chip U2, a third resistor R3, a reference voltage chip U3, a fourth resistor R4, a fifth resistor R5, a fourth capacitor C4, a sixth resistor R6, a seventh resistor R7, a first NMOS transistor Q1, an eighth resistor R8, a ninth resistor R9, a tenth resistor R10, an eleventh resistor R11, a twelfth resistor R12, a thirteenth resistor R13 and a fourteenth resistor R14.

A power pin VDD of the main control chip U2 is configured as the power terminal of the main control module 107, a ground pin VSS of the main control chip U2 is coupled to ground, a first input/output pin RA0 of the main control chip U2 is suspended. A first terminal of the third resistor R3 is coupled to the power pin VDD of the main control chip U2, a second terminal of the third resistor R3 and a first terminal of the fourth resistor R4 are collectively coupled to a cathode CATHODE of the reference voltage chip U3, an anode ANODE of the reference voltage chip U3 is coupled to ground, a vacant pin NC of the reference voltage chip U3 is suspended. A second terminal of the fourth resistor R4 is coupled to a second input/output pin RA1 of the main control chip U2. A third input/output pin RA2 of the main control chip U2 is configured as the current detection terminal of the main control module 107. A fourth input/output pin RA3 of the main control chip U2 is coupled to a first terminal of the fifth resistor R5, a second terminal of the fifth resistor R5 and a first terminal of the fourth capacitor C4 are collectively coupled to the power pin VDD of the main control chip U2, and a second terminal of the fourth capacitor C4 is coupled to ground. A fifth input/output pin RA4 of the main control chip U2 is configured as the switch control terminal of the main control module 107. A sixth input/output pin RA5 of the main control chip U2 is coupled to a first terminal of the sixth resistor R6, a second terminal of the sixth resistor R6 and a grid electrode of the first NMOS transistor Q1 are collectively coupled to a first terminal of the seventh resistor R7, a second terminal of the seventh resistor R7 and a source electrode of the first NMOS transistor Q1 are collectively coupled to ground, a drain electrode of the first NMOS transistor Q1 is coupled to a first terminal of the eighth resistor R8, a second terminal of the eighth resistor R8 is configured as the high-potential terminal of the main control module 107. A seventh input/output pin RC0 and an eighth input/output pin RC1 of the main control chip U2 are configured as the clock output terminal and the data output terminal of the main control module 107 respectively, a ninth input/output pin RC2 and a tenth input/output pin RC3 of the main control chip U2 are configured as the second voltage detection terminal and the first voltage detection terminal of the main control module 107 respectively. An eleventh input/output pin RC4 and a twelfth input/output pin RC5 of the main control chip U2 are coupled to a first terminal of the ninth resistor R9 and a first terminal of the tenth resistor R10 respectively, a first terminal of the eleventh resistor R11 and a first terminal of the twelfth resistor R12 are coupled to a second terminal of the ninth resistor R9 and a second terminal of the tenth resistor R10 respectively, a second terminal of the eleventh resistor R11 and a second terminal of the twelfth resistor R12 are collectively coupled to ground, a first terminal of the thirteenth resistor R13 and a first terminal of the fourteenth resistor R14 are coupled to the second terminal of the ninth resistor R9 and the second terminal of the tenth resistor R10 respectively, a second terminal of the thirteenth resistor R13 and a second terminal of the fourteenth resistor R14 are collectively coupled to the power pin VDD of the main control chip U2. The second terminal of the ninth resistor R9 and the second terminal of the tenth resistor R10 are configured as the first communication terminal and the second communication terminal of the main control module 107 respectively. The main control chip U2 may be a single chip microcontroller with a model of PIC12LF 1822, PIC12F 1822, PIC16LF1823 or PIC16F1823. The reference voltage chip U3 may be a reference voltage element with a model of LM4040.

The potential adjustment module 108 includes: a fifteenth resistor R15, a sixteenth resistor R16, a digital potentiometer U4, a seventeenth resistor R17, an eighteenth resistor R18, a fifth capacitor C5, a sixth capacitor C6 and a nineteenth resistor R19.

A collective node of a first terminal of the fifteenth resistor R15, a first terminal of the sixteenth resistor R15, a power pin VDD of the digital potentiometer U4 and a first terminal of the fifth capacitor C5 is configured as the power terminal of the potential adjustment module 108. A second terminal of the fifth capacitor C5, a first terminal of the sixth capacitor C6, a ground pin VSS of the digital potentiometer U4 and a first terminal of the seventeenth resistor R17 are collectively coupled to ground, and a second terminal of the sixth capacitor C6 is coupled to the power pin VDD of the digital potentiometer U4. A collective node of a second terminal of the fifteenth resistor R15 and a serial data pin SDA of the digital potentiometer U4 is configured as the data input terminal of the potential adjustment module 108. A collective node of a second terminal of the sixteenth resistor R16 and a clock input pin SCL of the digital potentiometer U4 is configured as the clock input terminal of the potential adjustment module 108. An address zero pin A0 of the digital potentiometer U4 is coupled to ground. A first potential wiring pin P0A of the digital potentiometer U4 and a first terminal of the eighteenth resistor R18 are collectively coupled to a second terminal of the seventeenth resistor R17. A second terminal of the eighteenth resistor R18 and a second potential wiring pin P0B of the digital potentiometer are collectively coupled to a first terminal of the nineteenth resistor R19, and a second terminal of the nineteenth resistor R19 is configured as the high-potential terminal of the potential adjustment module 108. A potential tap pin P0W of the digital potentiometer U4 is configured as the potential adjustment terminal of the potential adjustment module 108. The digital potentiometer U4 adjusts an internal slide rheostat according to a clock signal and a data signal output from the main control chip U2, such that a potential at a tap terminal (i.e. the potential tap pin P0W of the digital potentiometer U4) of the internal slide rheostat changes, thereby enabling the voltage tracking and control module 105 to follow this potential change for adjusting the output voltage of the isolation transformer 103. The digital potentiometer U4 specifically may be a digital potentiometer with a model of MCP45X1.

The current detection module 109 includes: a twentieth resistor R20, a twenty-first resistor R21, a twenty-second resistor R22, a seventh capacitor C7, an eighth capacitor C8, a current sensing chip U5, a twenty-third resistor R23, a ninth capacitor C9, a tenth capacitor C10 and a twenty-fourth resistor R24.

A first terminal and a second terminal of the twentieth resistor R20 are configured as the direct current input terminal and the direct current output terminal of the current detection module 109 respectively. A first terminal of the twenty-first resistor R21 and a first terminal of the twenty-second resistor R22 are coupled to the first terminal and the second terminal of the twentieth resistor R20 respectively. A second terminal of the twenty-first resistor R21 and a first terminal of the seventh capacitor C7 are collectively coupled to a positive input pin IN+ of the current sensing chip U5, and a second terminal of the twenty-second resistor R22 and a first terminal of the eighth capacitor C8 are collectively coupled to a negative input pin IN− of the current sensing chip U5. A collective node of a power pin V+ of the current sensing chip U5 and a first terminal of the ninth capacitor C9 is configured as the power terminal of the current detection module 109. A vacant pin NC of the current sensing chip U5 is suspended. An output pin OUT of the current sensing chip U5 is coupled to a first terminal of the twenty-third resistor R23. A second terminal of the twenty-third resistor R23 is configured as the current sensing and feedback terminal of the current detection module 109. A first terminal of the tenth capacitor C10 and a first terminal of the twenty-fourth resistor R24 are collectively coupled to the second terminal of the twenty-third resistor R23. A second terminal of the seventh capacitor C7, a second terminal of the eighth capacitor C8, a second terminal of the ninth capacitor C9, a second terminal of the tenth capacitor C10, a second terminal of the twenty-fourth resistor R24, and a ground pin GND, a first reference voltage pin REF1 and a second reference voltage pin REF2 of the current sensing chip U5 are collectively coupled to ground. The twentieth resistor R20, as a current sensing resistor, samples an output current of the output filter module 104 (i.e. the output current of the power adapter 100). Then, the current sensing chip U5 outputs the current detection signal to the main control chip U2 according to a voltage across two terminals of the twentieth resistor R20. The current sensing chip U5 may be a current shunt monitor with a model of INA286.

The voltage detection module 110 includes: a twenty-fifth resistor R25, a twenty-sixth resistor R26, an eleventh capacitor C11, a twelfth capacitor C12, a twenty-seventh resistor R27 and a twenty-eighth resistor R28.

A first terminal of the twenty-fifth resistor R25 is configured as the first detection terminal of the voltage detection module 110. A collective node of a second terminal of the twenty-fifth resistor R25, a first terminal of the twenty-sixth resistor R26 and a first terminal of the eleventh capacitor C11 is configured as the second output terminal of the voltage detection module 110. A second terminal of the twenty-sixth resistor R26 is configured as the second detection terminal of the voltage detection module 110. A second terminal of the eleventh capacitor C11, a first terminal of the twelfth capacitor C12 and a first terminal of the twenty-seventh resistor R27 are collectively coupled to the second terminal of the twenty-sixth resistor R26. A collective node of a second terminal of the twelfth capacitor C12, a second terminal of the twenty-seventh resistor R27 and a first terminal of the twenty-eighth resistor R28 is configured as the first output terminal of the voltage detection module 110. A second terminal of the twenty-eighth resistor R28 is configured as the third detection terminal of the voltage detection module 110.

The output switch module 111 includes: a twenty-ninth resistor R29, a thirtieth resistor R30, a thirteenth capacitor C13, a thirty-first resistor R31, a first NPN type transistor N1, a thirty-second resistor R32, a second NPN type transistor N2, a third diode D3, a voltage stabilizing diode ZD, a thirty-third resistor R33, a thirty-fourth resistor R34, a thirty-fifth resistor R35, a second NMOS transistor Q2 and a third NMOS transistor Q3.

A first terminal of the twenty-ninth resistor R29 is configured as the controlled terminal of the output switch module 111. A second terminal of the twenty-ninth resistor R29 and a first terminal of the thirtieth resistor R30 are collectively coupled to a base of the first NPN type transistor N1. A first terminal of the thirteenth capacitor C13, a first terminal of the thirty-first resistor R31 and a first terminal of the thirty-second resistor R32 are collectively coupled to a cathode of the third diode D3, and an anode of the third diode D3 is configured as the power terminal of the output switch module 111. A second terminal of the thirty-first resistor R31 and a base of the second NPN type transistor N2 are collectively coupled to a collector of the first NPN type transistor N1. A second terminal of the thirty-second resistor R32, a cathode of the voltage stabilizing diode ZD and a first terminal of the thirty-third resistor R33 are collectively coupled to a collector of the second NPN type transistor N2. A second terminal of the thirtieth resistor R30, a second terminal of the thirteenth capacitor C13, an emitter of the first NPN type transistor N1, an emitter of the second NPN type transistor N2 and an anode of the voltage stabilizing diode ZD are collectively coupled to ground. A second terminal of the thirty-third resistor R33, a first terminal of the thirty-fourth resistor R34, a first terminal of the thirty-fifth resistor R35, a grid electrode of the second NMOS transistor Q2 and a grid electrode of the third NMOS transistor Q3 are collectively coupled. A second terminal of the thirty-fourth resistor R34 is configured as the ground terminal of the output switch module 111. A drain electrode of the second NMOS transistor Q2 is configured as the input terminal of the output switch module 111. A source electrode of the second NMOS transistor Q2 and a second terminal of the thirty-fifth resistor R35 are collectively coupled to a source electrode of the third NMOS transistor Q3, and a drain electrode of the third NMOS transistor Q3 is configured as the output terminal of the output switch module 111. The second NMOS transistor Q2 and the third NMOS transistor Q3 are turned on or turned off simultaneously, thus turning on or turning off the direct current output of the power adapter 100.

Figure 6:
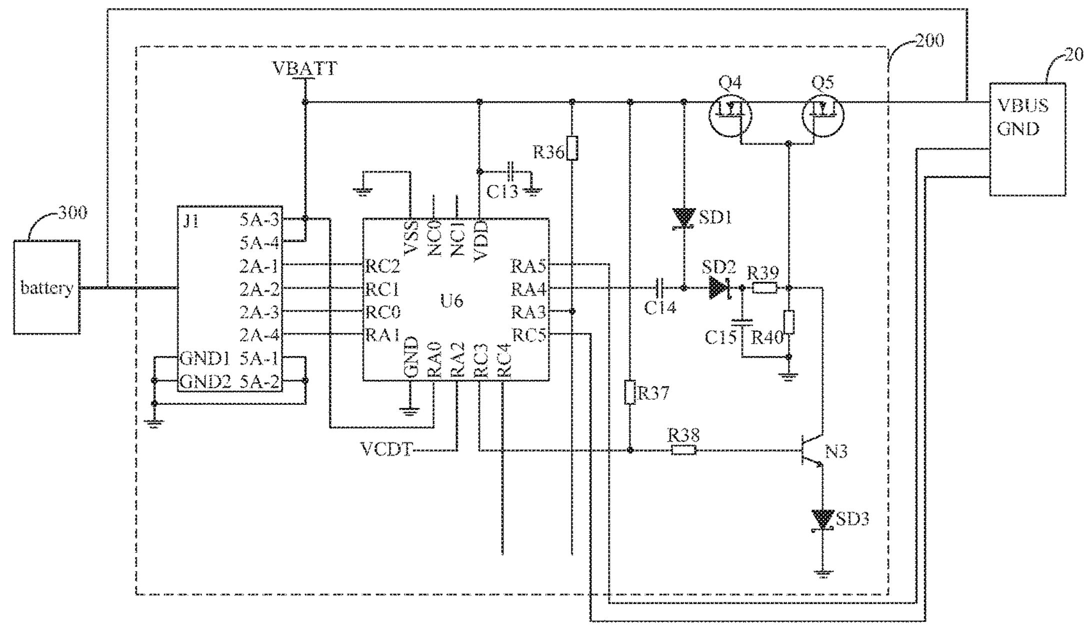
FIG. 6 is a schematic diagram showing an exemplary module structure of a charging control module in a charging control apparatus for an electronic device according to an embodiment of the present disclosure.

FIG. 6 illustrates an exemplary module structure of the above charging control module 200. For illustration purposes, only the parts related to embodiments of the present disclosure are shown, which will be described in detail as follows.

The charging control module 200 includes a battery connector J1, a main controller U6, a thirteenth capacitor C13, a thirty-sixth resistor R36, a thirty-seventh resistor R37, a fourteenth capacitor C14, a first Schottky diode SD1, a second Schottky diode SD2, a fifteenth capacitor C15, a thirty-eighth resistor R38, a thirty-ninth resistor R39, a fortieth resistor R40, a third NPN type transistor N3, a fourth NMOS transistor Q4 and a fifth NMOS transistor Q5.

The battery connector J1 is coupled to a plurality of electrodes of the battery 300. A first pin 5A-1 and a second pin 5A-2 of the battery connector J1 are collectively coupled to ground, and a first ground pin GND1 and a second ground pin GND2 of the battery connector J1 are collectively coupled to ground. A first input/output pin RA0 of the main controller U6 is coupled to a seventh pin 5A-3 and an eighth pin 5A-4 of the battery connector J1. A second input/output pin RA1, a seventh input/output pin RC0, an eighth input/output pin RC1 and a ninth input/output pin RC2 of the main controller U6 are coupled to a sixth pin 2A-4, a fifth pin 2A-3, a fourth pin 2A-2 and a third pin 2A-1 of the battery connector J1 respectively. An analog ground pin VSS and a ground pin GND of the main controller U6 are coupled to ground. A first vacant pin NCO and a second vacant pin NC1 of the main controller U6 are suspended. Each of power pin VDD of the main controller U6 and a first terminal of the thirteenth capacitor C13 is collectively coupled to the seventh pin 5A-3 and the eighth pin 5A-4 of the battery connector J1. A fourth input/output pin RA3 and an eleventh input/output pin RC4 of the main controller U6 perform data communication with the electronic device. The thirty-sixth resistor R36 is coupled between the fourth input/output pin RA3 and the power pin VDD of the main controller U6. A sixth input/output pin RA5 and a twelfth input/output pin RC5 of the main controller U6 are coupled to the first communication terminal and the second communication terminal of the main control module 107 in the power adapter 100 respectively. A first terminal of the thirty-seventh resistor R37 and a first terminal of the thirty-eighth resistor R38 are collectively coupled to a tenth input/output pin RC3 of the main controller U6. A second terminal of the thirty-seventh resistor R37 is coupled to the power pin VDD of the power adapter U6. A second terminal of the thirty-eighth resistor R38 is coupled to a base of the third NPN type transistor N3. A fifth input/output pin RA4 of the main controller U6 is coupled to a first terminal of the fourteenth capacitor C14, a second terminal of the fourteenth capacitor C14 and a cathode of the first Schottky diode SD1 are collectively coupled to an anode of the second Schottky diode SD2, a first terminal of the thirty-ninth resistor R39 and a first terminal of the fifteenth capacitor C15 are collectively coupled to a cathode of the second Schottky diode SD2, and each of a second terminal of the thirty-ninth resistor R39, a first terminal of the fortieth resistor R40 and a collector of the third NPN type transistor N3 is coupled to a grid electrode of the fourth NMOS transistor Q4 and a grid electrode of the fifth NMOS transistor Q5, and a second terminal of the fortieth resistor R40 and a second terminal of the fifteenth capacitor C15 are collectively coupled to ground. A source electrode of the fourth NMOS transistor Q4 is coupled to an anode of the first Schottky diode SD1 and further coupled to the seventh pin 5A-3 and the eighth pin 5A-4 of the battery connector J1. A drain electrode of the fourth NMOS transistor Q4 is coupled to a drain electrode of the fifth NMOS transistor Q5. A source electrode of the fifth NMOS transistor Q5 is coupled to a power wire VBUS of the communication interface 20 of the electronic device. An emitter of the third NPN type transistor N3 is coupled to an anode of the third Schottky diode SD3, and a cathode of the third Schottky diode SD3 is coupled to ground. The main controller U6 may be a single chip microcontroller with a model of PIC12LF1501, PIC12F1501, PIC16LF1503, PIC16F1503, PIC16LF1507, PIC16F1507, PIC16LF1508, PIC16F1508, PIC16LF1509 or PIC16F1509.

The main controller U6 performs data communication with the electronic device via the fourth input/output pin RA3 and the eleventh input/output pin RC4. The main controller U6 sends voltage and electric quantity information of the battery 300 to the electronic device (such as a mobile phone). The main controller U6 also determines whether the quick-charging process of the battery 300 is completed according to the voltage of the battery 300. If the quick-charging is completed, the main controller U6 feeds back a quick-charging turning-off instruction to inform the electronic device of switching a charging mode from a quick-charging mode to a conventional charging mode. During the process of charging the battery 300 by the power adapter 100, if the communication interface 10 of the power adapter 100 is disconnected from the communication interface 20 of the electronic device suddenly, the main controller U6 detects the voltage of the battery 300 via the battery connector J1 and feeds back a charging stop instruction to inform the electronic device of closing the communication interface 20. In addition, if the electronic device is able to detect a temperature of the battery 300, it may inform the main controller U6 to turn off the fourth NMOS transistor Q4 and the fifth NMOS transistor Q5 when the temperature is abnormal, thus stopping the quick-charging of the battery 300. Meanwhile, the electronic device switches the charging mode from the quick-charging mode to the conventional charging mode.

During the process of quick-charging the battery 300 by the power adapter 100, the charging control module 200 introduces the direct current from the power adapter 100 for charging the battery 300, which is realize in such a way that, the main controller U6 outputs a control signal via the fifth input/output pin RA4 thereof for controlling the fourth NMOS transistor Q4 and the fifth NMOS transistor Q5 to turn on, and controls the third NPN-type transistor N3 to turn off via the tenth input/output pin RC3, such that the communication interface 20 of the electronic device introduces the direct current from the communication interface 10 of the power adapter 100 for charging the battery 300. Since the battery 300 itself obtains the direct current from the power adapter 100 via the communication interface 20 of the electronic device, the direct current introduced by the charging control module 200 plays a role of increasing the charging current of charging the battery 300, thereby realizing the quick-charging for the battery 300.

Figure 7:
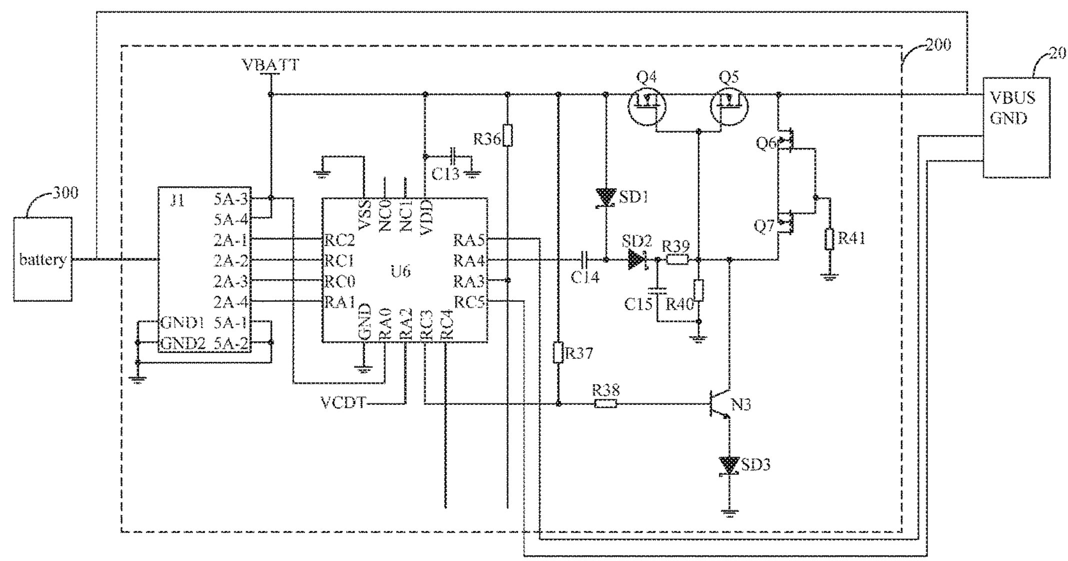
FIG. 7 is a schematic diagram showing another exemplary module structure of a charging control module in a charging control apparatus for an electronic device according to an embodiment of the present disclosure.

In addition, during the process of quick-charging the battery 300 by the power adapter 100, and during the process of introducing the direct current by the charging control module 200 from the power adapter 100 for charging the battery 300, if the power wire VBUS and the ground wire GND of the communication interface 10 of the power adapter 100 are reversedly coupled to the power wire VUS and the ground wire GND of the communication interface 20 of the electronic device via data lines (i.e. the power wire VBUS and the ground wire GND of the communication interface 10 of the power adapter 100 are coupled to the ground of the charging control module 200 and the source electrode of the fifth NMOS transistor Q5 respectively), components in the charging control module 200 may be damaged. In order to avoid problems of damaging the components, as shown in FIG. 7, the charging control module 200 may further includes a sixth NMOS transistor Q6, a seventh NMOS transistor Q7 and a forty-first resistor R41. A source electrode of the sixth NMOS transistor Q6 is coupled to a source electrode of the fifth NMOS transistor Q5, a drain electrode of the sixth NMOS transistor Q6 is coupled to a drain electrode of the seventh NMOS transistor Q7, a source electrode of the seventh NMOS transistor Q7 is coupled to a collector of the third NPN transistor N3, a grid electrode of the sixth NMOS transistor Q6 and a grid electrode of the seventh NMOS transistor Q7 are collectively coupled to a first terminal of the forty-first resistor R41, and a second terminal of the forty-first resistor R42 is coupled to ground.

When the above problem of reversed connection occurs, the second terminal of the forty-first resistor R41 accesses the direct current from the ground for driving the sixth NMOS transistor Q6 and the seventh NMOS transistor Q7 to turn off, such that the direct current entering the charging control module 200 from the ground cannot form a loop, thereby protecting the components in the charging control module 200 from damage.

In embodiments of the present disclosure, during the process of charging the battery 300 in the electronic device by the charging control apparatus for the electronic device, the power adapter 100 charges the battery 300 with the constant-voltage direct-current output firstly. Then, after the power adapter 100 receives the quick-charging instruction sent by the charging control module, the power adapter 100 adjusts the output voltage according to the voltage of the battery 300 fed back by the charging control module 200. If this output voltage meets the quick-charging voltage condition pre-set by the charging control module 200, the power adapter 100 adjusts the output current and the output voltage according to the preset quick-charging current value and the preset quick-charging voltage value for quick-charging the battery 300 in the electronic device, and meanwhile the charging control module 200 introduces the direct current from the power adapter 100 for charging the battery 300. During the process of quick-charging, the power adapter 100 further adjusts the output current in real time according to the output voltage thereof and the voltage of the battery 300. Therefore, the objective of realizing the quick-charging for the battery 300 by adjusting the output current and the output voltage of the power adapter 100 is realized.

The foregoing description is preferred embodiments of the present disclosure, and cannot be used to limit the present disclosure. Equivalents, alternatives and obvious variants may be made without departing from the spirit of the present disclosure, may belong to the protection scope determined by the claims submitted in the present disclosure.

What is claimed is:

1. A charging control apparatus for an electronic device, comprising a power adapter and a charging control module; the power adapter being configured to charge a battery in the electronic device and to perform data communication with the charging control module via a communication interface of the power adapter; the charging control module being built in the electronic device and being configured to detect a voltage of the battery; each of the charging control module and the battery being coupled to the communication interface of the power adapter via a communication interface of the electronic device;

wherein, during a process of charging the battery, the power adapter first charges the battery with a constant-voltage direct current output, and then after the power adapter receives a quick-charging instruction sent by the charging control module, the power adapter adjusts an output voltage according to the voltage of the battery fed back by the charging control module, and when the output voltage meets a quick-charging voltage condition pre-set by the charging control module, the power adapter adjusts an output current and the output voltage respectively according to a preset quick-charging current value and a preset quick-charging voltage value for quick-charging the battery, and meanwhile the charging control module introduces direct current from the power adapter for charging the battery; and during a process of quick-charging the battery, the power adapter adjusts the output current in real time according to the output voltage thereof and the voltage of the battery;

wherein the power adapter receiving the quick-charging instruction sent by the charging control module comprises that: when the power adapter performs data communication with the charging control module, the power adapter sends a quick-charging inquiry instruction to the charging control module when the output current of the power adapter is within a conventional current range during a preset period of time; the charging control module determines the voltage of the battery according to the quick-charging inquiry instruction; and the charging control module feeds back the quick-charging instruction to the power adapter when the voltage of the battery reaches the quick-charging voltage value.

2. The apparatus according to claim 1, wherein the power adapter is configured to send the output voltage to the charging control module;

the charging control module is configured to determine whether the output voltage meets the quick-charging voltage condition, and to send a first message to the power adapter when the output voltage meets the quick-charging voltage condition;

the power adapter is further configured to adjust the output current and the output voltage respectively according to the preset quick-charging current value and the preset quick-charging voltage value for quick-charging the battery based on the first message.

3. The apparatus according to claim 2, wherein the quick-charging voltage condition comprises a quick-charging voltage range.

4. The apparatus according to claim 2, wherein the charging control module is configured to send a second message to the power adapter when the output voltage does not meet the quick-charging voltage condition, wherein the second message comprises a voltage deviation value;

the power adapter is further configured to adjust the output current based on the voltage deviation value.

5. The apparatus according to claim 1, wherein the power adapter is configured to charge the battery with the constant-voltage direct current by acts of:

detecting a voltage at the communication interface of the power adapter under a case that the direct current output of the power adapter is turned off;

determining whether the voltage at the communication interface is greater than a voltage threshold; and outputting the constant-voltage direct current based on a preset conventional output voltage when the voltage at the communication interface is not greater than the voltage threshold.

6. The apparatus according to claim 5, wherein the power adapter is configured to return the detecting act when the voltage at the communication interface is greater than the voltage threshold.

7. The apparatus according to claim 1, wherein the power adapter is configured to adjust the output voltage according to the voltage of the battery fed back by the charging control module by acts of:

calculating a sum of the voltage of the battery and a preset voltage incremental value; and adjusting the output voltage based on the sum.

8. The apparatus according to claim 1, wherein the power adapter is configured to adjust the output current in real time according to the output voltage and the voltage of the battery by acts of:

determining whether a difference between the output voltage and the voltage of the battery is greater than a voltage difference threshold; and adjusting the output current based on the voltage of the battery when the difference between the output voltage and the voltage of the battery is not greater than the voltage difference threshold.

9. The apparatus according to claim 8, wherein the power adapter is further configured to turn off the direct current output when the difference between the output voltage and the voltage of the battery is greater than the voltage difference threshold.

10. The apparatus according to claim 1, wherein the constant-voltage direct current is less than 4 A.

11. The apparatus according to claim 1, wherein the output current for quick-charging the battery is no less than 4 A.

12. The apparatus according to claim 1, wherein the output voltage for quick-charging is in a range from about 3.4V to about 4.8V.

13. A charging control method for an electronic device, applied on the charging control apparatus according to claim 1 and comprising steps of:

during a process of charging a battery of the electronic device, firstly charging the battery by a power adapter with a constant-voltage direct-current output;

after receiving a quick-charging instruction sent by a charging control module, adjusting an output voltage by the power adapter according to a voltage of the battery fed back by the charging control module;

when the output voltage meets a quick-charging voltage condition pre-set, adjusting an output current and the output voltage respectively by the power adapter according to a preset quick-charging current value and a preset quick-charging voltage value for quick-charging the battery, and introducing a direct current from the power adapter simultaneously by the charging control module for charging the battery;

adjusting the output current in real time by the power adapter according to the output voltage of the power adapter and the voltage of the battery.

14. The method according to claim 13, wherein adjusting the output current and the output voltage respectively by the power adapter according to the preset quick-charging current value and the preset quick-charging voltage value for quick-charging the battery, comprises:

sending by the power adapter the output voltage to the charging control module;

receiving by the power adapter, a first message sent by the charging control module, wherein the first message is configured to indicate that the output voltage meets the quick-charging voltage condition;

adjusting the output current and the output voltage respectively by the power adapter according to the preset quick-charging current value and the preset quick-charging voltage value for quick-charging the battery based on the first message.

15. The method according to claim 14, further comprising:

receiving by the power adapter, a second message sent by the charging control module, wherein the second message is configured to indicate that the output voltage does not meet the quick-charging voltage condition and the second message comprises a voltage deviation value;

adjusting by the power adapter the output current based on the voltage deviation value.

16. The method according to claim 13, wherein charging by the power adapter the battery with the constant-voltage direct current comprises:

detecting by the power adapter a voltage at the communication interface of the power adapter under a case that the direct current output of the power adapter is turned off;

determining by the power adapter whether the voltage at the communication interface is greater than a voltage threshold; and outputting by the power adapter the constant-voltage direct current based on a preset conventional output voltage when the voltage at the communication interface is not greater than the voltage threshold.

17. The method according to claim 16, further comprising:

returning by the power adapter the detecting act when the voltage at the communication interface is greater than the voltage threshold.

18. The method according to claim 13, wherein adjusting by the power adapter the output voltage according to the voltage of the battery fed back by the charging control module comprises:

calculating by the power adapter a sum of the voltage of the battery and a preset voltage incremental value; and adjusting by the power adapter the output voltage based on the sum.

19. The method according to claim 13, wherein adjusting by the power adapter the output current in real time according to the output voltage and the voltage of the battery comprises:

determining by the power adapter whether a difference between the output voltage and the voltage of the battery is greater than a voltage difference threshold; and adjusting by the power adapter the output current based on the voltage of the battery when the difference between the output voltage and the voltage of the battery is not greater than the voltage difference threshold.

20. The method according to claim 19, further comprising:

turning off by the power adapter the direct current output when the difference between the output voltage and the voltage of the battery is greater than the voltage difference threshold.

* * * * *